June 9, 1931.  R. F. BRIMER  1,809,190
APPARATUS FOR HANDLING ARTICLES FOR COATING
Filed Aug. 17, 1927  2 Sheets-Sheet 2
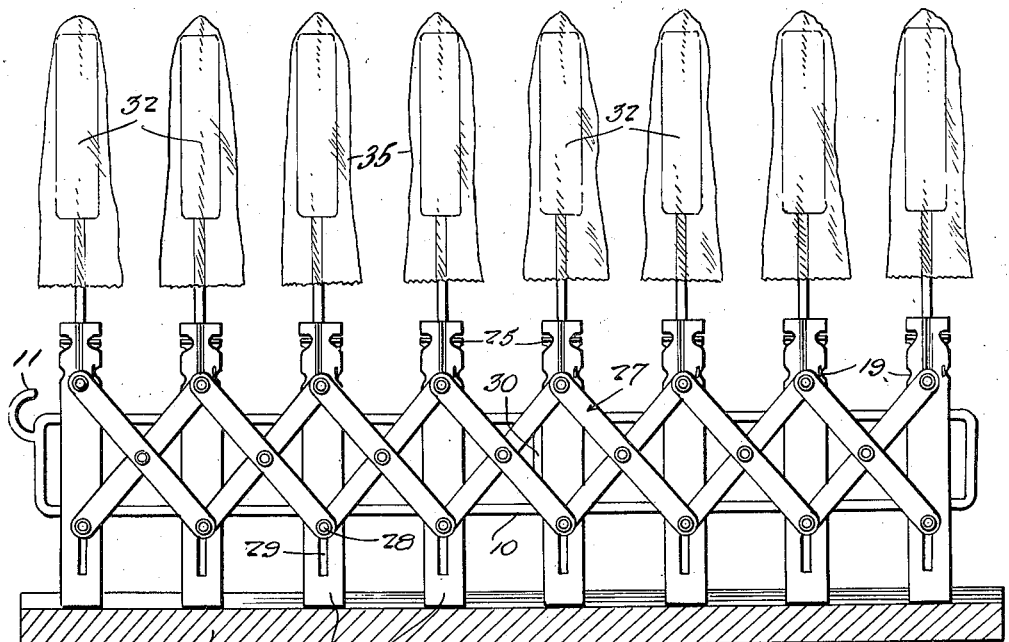
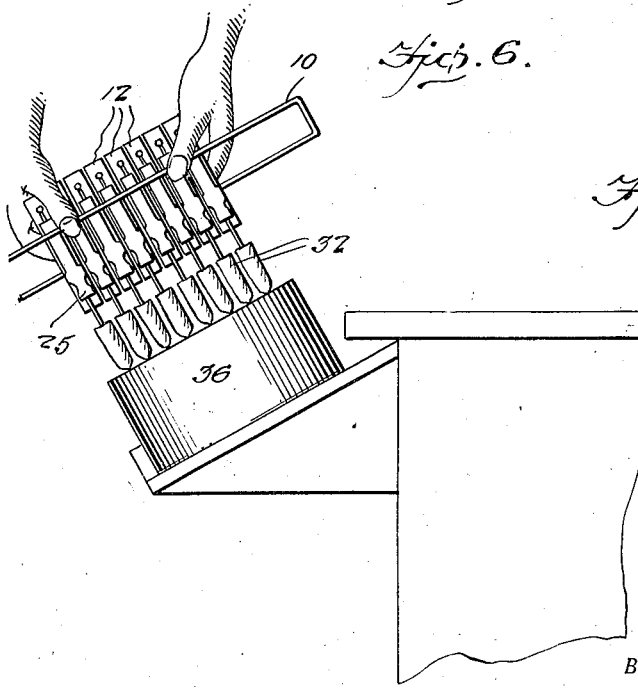
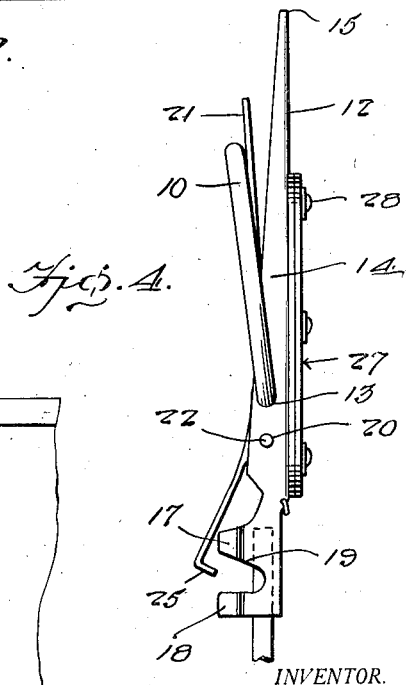
INVENTOR.
Robert F. Brimer
BY
ATTORNEY.

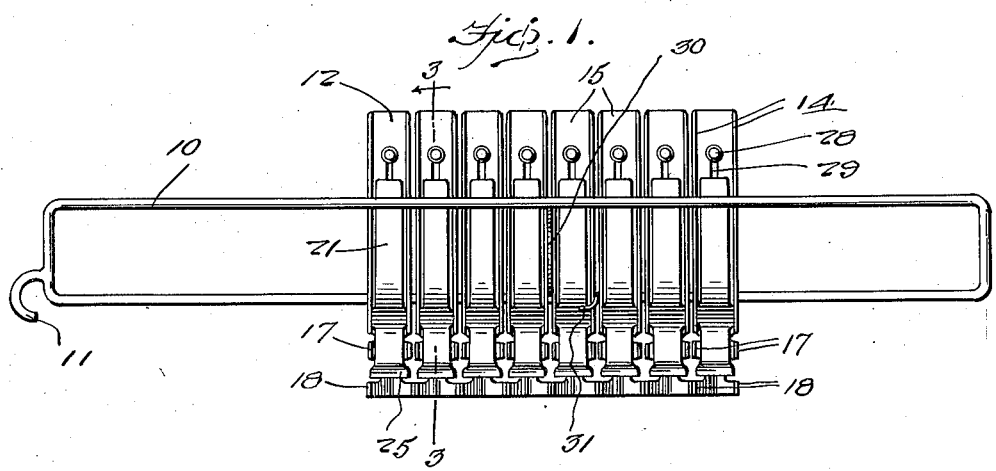
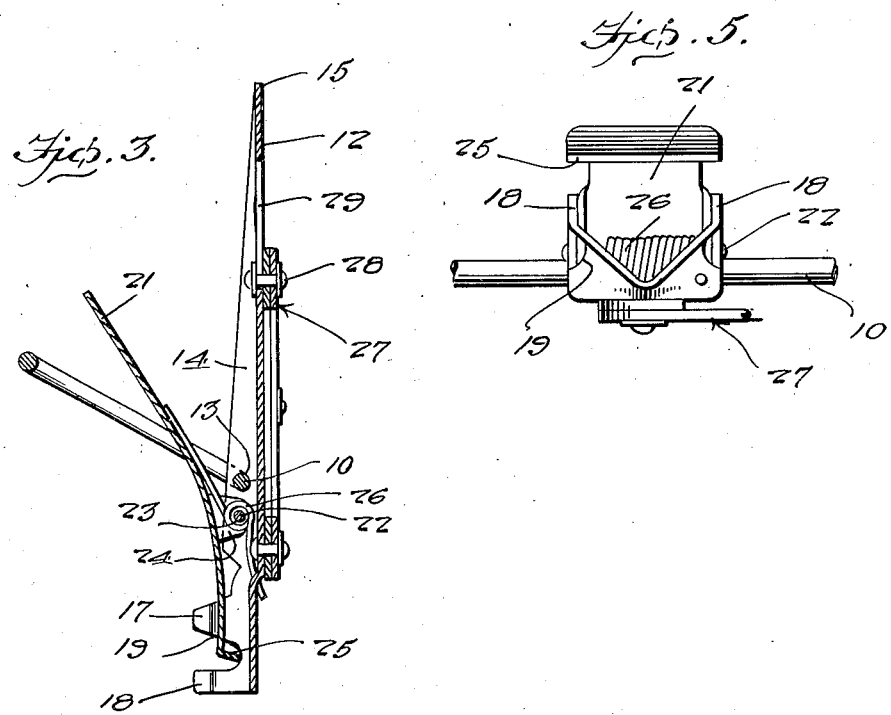

Patented June 9, 1931

1,809,190

UNITED STATES PATENT OFFICE

ROBERT F. BRIMER, OF WASHINGTON, DISTRICT OF COLUMBIA

APPARATUS FOR HANDLING ARTICLES FOR COATING

Application filed August 17, 1927. Serial No. 213,636.

My invention relates to improvements in coating, and particularly to apparatus for coating confections.

At the present time blocks of ice cream are applied to sticks and coated with various flavoring syrups and other edible substances which adhere to and harden on the surface of the ice cream. The ice cream is frozen in a mold of predetermined dimensions and when the cream has reached the proper consistency sticks are inserted into the mass of frozen cream at regular spaced intervals. The product is then stored in a very cold vat until ready for use.

In the manufacture of the individual blocks of ice cream on sticks the first step is to cut the mass of frozen cream into a plurality of blocks between the rows of sticks, then to separate the blocks, to dip each one in a coating liquid, shake it to remove surplus coating, and finally to stand each block up to harden the coating by inserting the end of the stick in a hole in a support. While the coating is hardening bags are placed over the blocks while in upright position, and then the blocks are again handled individually in packing them in the containers. All of this work is done by hand, and it is necessary for the workmen to grasp each stick individually in handling the blocks, all of which requires extra labor and a long period of time.

With the foregoing in mind, an important object of my invention is to overcome the above difficulties by providing a device which is operable to collectively or individually seize and release any number of sticks holding blocks of ice cream without touching the ice cream or sticks with the hands, and without the aid of other implements.

Another object of the invention is to provide a device which is designed to grasp, separate, dip, shake and pack a number of blocks of ice cream or confections at one time.

A further object of the invention is to provide an apparatus for handling articles which have a projecting stick or other handle and provided with means for guiding the articles into the gripping means.

It is also an object of the invention to provide a device of the above character which is extremely sure in operation and simple and durable in construction.

Other objects and advantages of the invention will become apparent during the course of the following description which is to be read in connection with the accompanying drawings, in which Fig. 1 is a front elevation of a device embodying my invention in closed position;

Fig. 2 is a rear elevation of the same device shown in extended position holding a number of stick confections and mounted upright in a support;

Fig. 3 is a sectional view on the line 3—3 of Fig. 1;

Fig. 4 is a side elevation of the device with gripping jaws in open position;

Fig. 5 is an enlarged fragmentary end view of the device with gripping jaws in open position; and Fig. 6 is a view showing the device in use during packing operation.

Referring to the drawings, the numeral 10 designates a rectangular rigid metal frame provided with a hook 11 at one end. A plurality of members 12 of channel cross section are provided with openings 13 in their sides 14 to receive one rod of the frame 10 and form a bearing for partial rotation of the frame, and to slidably mount the members 12 on the frame. The sides 14 taper to a narrow width at the ends 15 of the members 12 for a purpose to be later described, and at their other ends the members 12 are crimped into or provided with substantially V shaped mouths with opposite spaced pairs of ears 17 and 18 forming a notch 19. Each of the members 12 is also provided with aligned openings 20 thru the sides 14 at a point between the openings 13 and ears 17. A second member 21, of a width to fit between the sides of the members 12, is pivotally secured to the members 12 by inserting a pin 22 thru openings 23 in the ears 24 of the members 21 and thru the aligning openings 20 of the members 12. One end of the member 21 is bent at substantially right angles to the members 12 to form a gripping jaw 25 operable within the notch 19 against the V shaped mouth of the members 12, and the other end of the member 21 is bent or flared upward from the pivot point 22 toward the rod of the frame 10 opposite to the rod to which the members are attached. A spring 26 is mounted around the pin 22 with its arms bearing against opposite surfaces of the members 12 and 21 and normally urges the gripping jaw 25 against the V shaped mouth of the members 12.

Each of the members 12 is slidably mounted on the frame 10 and collective uniform movement of the members 12 along the frame 10 is obtained by means of the lazy tong 27 secured to the members 12 by means of the rivets 28 which slidably operated in the longitudinal slots 29 in the members 12, the slots 29 defining one means of limiting movement of the members 12 along the frame, while the ends of the frame too serve to limit the sliding movement of the members. A bar 30 extends across the center of the frame 10 to separate the members 12 into groups and to maintain the members 12 in centralized position on the frame. A hook 31 is also provided on the frame 10 to cooperate with the bar 30 in maintaining the members 12 in centralized or predetermined position on the frame and to prevent the frame 10 from rotating more than is necessary around the bearings 13 of the members 12. By this arrangement one rod of the frame is maintained in position above the flared ends of the members 21 for partial rotation towards the members 12 to collectively move the members 21 on their pivot 22 thus opening and closing the jaws 25 of all of the members collectively against the action of the springs 26. It will also be apparent that any of the members are individually operable by pressing on any single member 21 to open the jaw 25.

In operation, when a mass of ice cream is cut into a plurality of blocks 32 each provided with a stick 33, my apparatus is positioned as shown in Fig. 1, with the gripping members contracted into central position on the frame 10 and the jaws 25 down. By pressing the top rod of the frame 10 to turn it on its pivot 13 all of the flared ends of the members 21 are carried downward toward the members 12 which action raises the jaws 25 against the action of the springs 26 to open position as shown in Fig. 4. It is assumed that the sticks are upstanding in rows of cut blocks which must be separated, so the V shaped mouths of the members 12 are urged toward the sticks until the sticks slide evenly down into the bottom of the V and above the gripping jaw 25 at which time the pressure on the rod is released and the springs 26 automatically return the gripping jaws 25 to closed position where they seize the sticks within the V mouth to firmly grasp them for handling. The members 12 are now opened by sliding along the frame 10 to separate the blocks of cream, as shown in Fig. 2, and the blocks of ice cream simultaneously dipped into the coating substance, and shaken. By referring to Fig. 2 it will be noted that a supporting frame 34 is provided with grooves to receive the ends 15 of the gripping members to hold the apparatus in inverted position with the coated confections upright for hardening of the coating and in position to receive the bags 35. As soon as the bags are applied the apparatus is removed from the support 34 and the members 12 are slidably moved along the frame 10 to the position shown in Fig. 6 for packing, which operation is effected by simply pressing against the top rod of the frame 10 to again open the jaws 25 and permit all of the confections to simultaneously drop into the container 36.

It sometimes happens that when the blocks are cut the rows of sticks are in staggered position. The V shaped mouth is designed to form a guide channel to align the sticks within the gripping jaws and greatly facilitate picking up a row of blocks which may be in staggered relation since the sloping sides of the mouth permit a wide range of action and as pressure is exerted against the sticks they slide into the bottom of the V in position to be grasped by the jaw 25, it being understood that the weight of the block of cream prevents tumbling.

I have provided the hook 11 on the frame 10 to permit return of the apparatus to the table where the blocks are cut for a repeat of the dipping and packing operations. By providing a sloping track or wire to receive the hook 11 the return can be effected by simply hanging the apparatus on the track or wire by the hook 11.

I would also point out that the apparatus takes care of individual handling as well as collective handling, and any block is individually releasable. It sometimes happens that a block of cream is defective by reason of air bubbles, or other reasons, and in such case the operator has only to press on the member 21 which holds the defective block to effect release thereof without dumping the entire batch.

I have found that in practice the use of my device reduces labor by approximately 45% and increases the speed of production which is essential in handling ice cream. The device is illustrated as carrying eight gripping members because that is the usual number of blocks of ice cream obtained from a cutting in the width of the molded mass, but of course the number can be varied at will. It is also possible to combine two or more frames carrying any number of gripping frames to handle more than one row of confections, and while I have described the device as particularly useful in handling ice cream on sticks I would have it understood that I do not limit the invention to such particular use, nor to the size, shape, or particular materials and details which can be varied at will without departing from the spirit of the invention or scope of the appended claims.

I claim as my invention:

1. An article handling device comprising a frame, a plurality of gripping members slidably mounted on the frame and forming a bearing for partial rotation of the frame, said members being collectively releasable by relative movement between the frame and members.

2. A device for handling stick confections comprising a pair of pivoted gripping members, a frame pivotally connected to said gripping members, the gripping members being slidably adjustable on the frame and collectively releasable by relative movement between the frame and members.

3. The structure of claim 2 wherein the gripping members are provided with enlarged mouths forming a guide to align the articles to be gripped within the gripping members as the device is moved into engagement with the sticks.

4. An article handling device comprising a plurality of members having mouths to receive the articles, means connecting said members together for adjustable lateral movement, a plurality of gripping members having a portion operable within said mouths to grasp the articles, and a member engageable with said gripping members to collectively operate said portions with respect to said mouths.

5. An article handling device comprising a frame having spaced rods, a plurality of gripping members associated with one rod and laterally adjustable with respect thereto, said gripping members having cooperating jaws operable by movement of the rod opposite the one with which the gripping members are associated.

6. In an article handling device, a plurality of gripping members comprising a portion having upstanding pairs of spaced ears, a substantially V-shaped channel between said pairs of spaced ears, a member associated with said first member and having a portion operable between said pairs of spaced ears within said channel to grasp articles therein, means connecting said members for collective lateral adjustment, and means for operating said second members collectively to grasp a plurality of articles in said channels.

In testimony whereof I have hereunto attached my signature.

ROBERT F. BRIMER.